June 13, 1967 K. H. BUCHMANN ETAL 3,324,528
CHIP-REMOVING TOOL
Filed Oct. 23, 1964 2 Sheets-Sheet 2
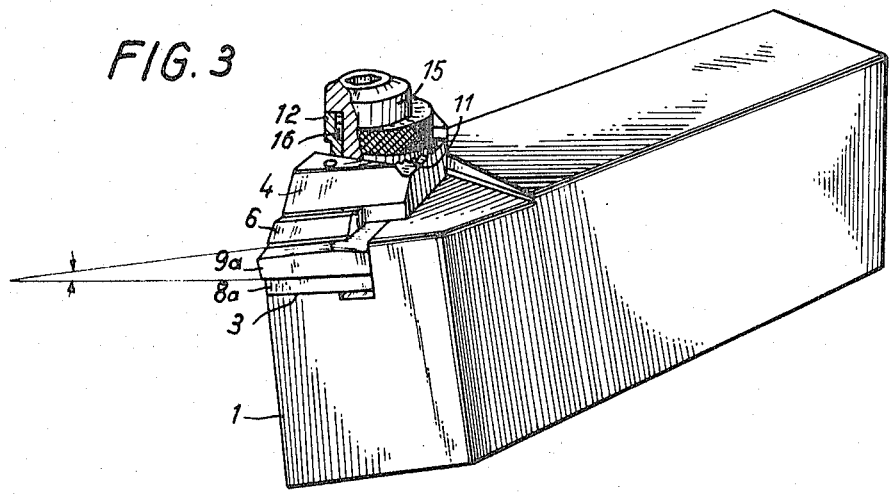
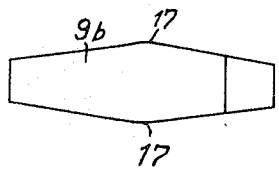
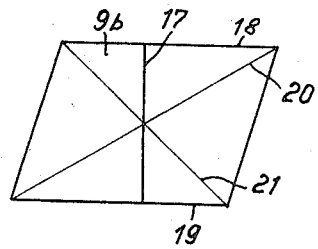
Inventors:
Kurt Hermann Buchmann
Heinrich Krüger
By United States Patent Office 3,324,528
Patented June 13, 1967

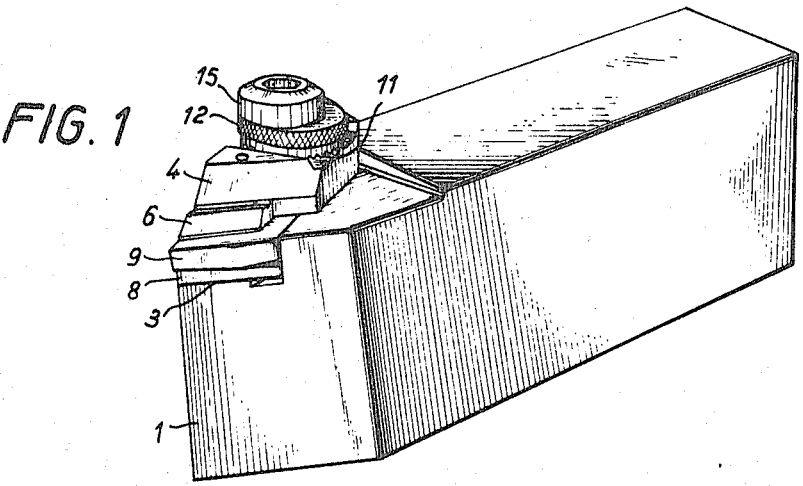
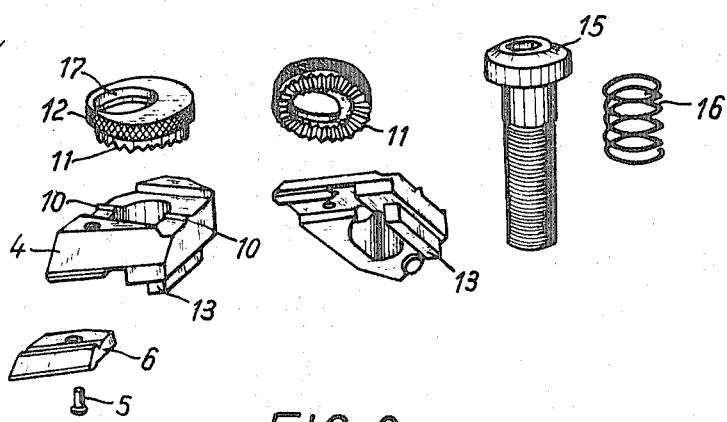
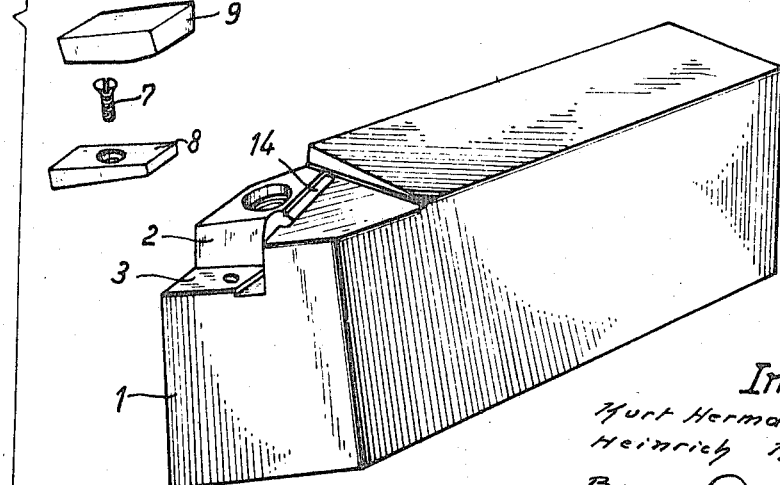

3,324,528
CHIP-REMOVING TOOL
Kurt Hermann Buchmann and Heinrich Krüger, Essen, Germany, assignors to Beteiligungs- und Patentverwaltungsgesellschaft mit beschränkter Haftung, Essen, Germany
Filed Oct. 23, 1964, Ser. No. 405,990
Claims priority, application Germany, Feb. 20, 1964, B 75,502
4 Claims. (Cl. 29—96)

The present invention relates to a chip-removing tool the cutting body of which is, by means of a clamping screw or a similarly effective clamping element through the intervention of a clamping claw, clamped against the bottom of a recess in a tool shank or a washer plate connected to the tool shank, said clamping claw being provided with a chip-forming element and having an oblong hole or slot for the clamping screw or the like.

With heretofore known chip-removing tools of this type, there exists the danger that the cutting body is turned out or pulled out of the holder. This danger is particularly acute when employing chip-removing tools for turning on copying lathes, inasmuch as in this connection it frequently occurs that in a single working cycle the copying turning is effected inwardly longitudinally and outwardly. The chip-removing forces which, with these various copying turning operations act in different directions, subject the mechanically fastened cutting body to such stresses that the latter is turned out, for instance during a longitudinal copying turning operation, or is pulled out, for instance when copy-turning in outward direction.

Various suggestions have been made in an effort to avoid the above mentioned drawbacks. Thus, a chip-removing tool has been developed, the cutting body of which is provided with a bore engaged by a pin connected to a tool shank. Furthermore, a chip-removing tool has become known in which the cutting body is provided with recesses and is retained in a clamping claw by means of a corresponding nose. According to a still further heretofore known chip-removing tool, the clamping of the cutting body is effected on the end-cutting edge. In this instance, a nose pulls the cutting body onto its seat.

It is an object of the present invention to provide a chip-removing tool which will overcome the above mentioned drawbacks.

It is another object of this invention to provide a chip-removing tool which will safely hold the cutting body without the necessity of employing additional holding means such as pins, clamping noses or the like.

These and other objects and advantages of the invention will appear more clearly from the following specification in connection with the accompanying drawing, in which:

FIG. 1 illustrates a chip-removing tool according to the invention in assembled condition.

FIG. 2 shows an exploded view of the chip-removing tool of FIG. 1.

FIG. 3 shows another chip-removing tool according to the invention.

FIG. 4 shows a front view of a cutting body for the chip-removing tool according to the invention in a larger scale.

FIG. 5 shows a top view of the cutting body of FIG. 4.

The chip-removing tool according to the present invention is characterized primarily in that the lower clamping surface formed by the bottom of a recess in the tool shank or the washer plate concerned to the shank forms with the upper clamping surface for the cutting body an angle, the apex of which is located on that side which faces away from the tool shank, i.e. when looking from the tool shank, it is located on the other side of the cutting body, said upper clamping surface for the cutting body being formed by a clamping claw or the chip-forming element. An arrangement of this type will assure that the cutting body will, during the various copy-turning operations, retains its position relative to the tool shank. To this end, the washer plate may, for instance be wedge-shaped.

According to a further feature of the present invention, between the head of the clamping screw and the top side of the clamping claw there is provided an eccentric ring which has its bottom side provided with serrated means engaged by at least one web or elevation provided on the top side of the clamping claw. In this way, a fine adjustment of the step width of the chip will be possible. In order to prevent the once adjusted step width of the chip from changing when turning or exchanging the cutting body, there is, for instance provided a spring which, between the head of the clamping screw and the top side of the eccentric ring or the clamping claw, is slipped over the clamping screw. For a parallel guiding of the clamping claw, the clamping claw has its bottom side provided with a protrusion which engages a slot in the top side of the tool shank.

The bottom and/or top side of the cutting body for the chip-removing tool according to the present invention is advantageously roof-shaped. In this connection, it is advantageous so to design the cutting body that the latter, when looking on top thereof, has the shape of a parallelogram while the edge of the roof shape extends perpendicularly with regard to two opposite sides of said parallelogram and bisects the diagonals thereof. In this way, the cutting body may be inserted into the tool shank in different positions.

Referring now to the drawing in detail, the chip-removing tool comprises a tool shank 1 provided with a recess or step 2. As seen from FIG. 1 the bottom 3 of said recess 2 is parallel to the bottom side of a clamping claw 4 or chip-forming element 6 which is fixedly connected to such clamping claw 4 by means of a pin 5. A wedge-shaped washer plate 8 is, by means of a screw 7, connected to bottom 3 of recess 2. As indicated in FIG. 3 bottom 3 may, if desired, form an angle with the bottom side of clamping claw 4 or of the chip-forming element 6. In this instance, top and bottom side of the washer plate 8a may be parallel to each other. The arrangement according to FIG. 1 furthermore comprises a cutting body 9 the bottom side of which is roof-shaped in order to permit insertion of the cutting body 9 into shank 1 in different positions. Also as shown in FIG. 3 a cutting body 9a can be used, the top side of which is roof-shaped. Further, a cutting body 9b as shown in FIG. 4 can be used.

The top side of clamping claw 4 is provided with webs or elevations 10 for engagement with a serrated surface 11 at the bottom side of an eccentric ring 12. The bottom side of clamping claw 4 is furthermore provided with a protrusion 13 for engagement with a slot or depression 14 in the top side of the tool shank 1.

The arrangement also comprises a clamping screw 15 for clamping or locking the cutting body 9. In order to prevent the eccentric ring 12 from lifting itself off from the clamping claw 4 when loosening clamping screw 15, there is provided a spring 16 which on one hand rests against the head of clamping screw 15 and on the other hand rests against the eccentric ring 12. When spring 16 is in its compressed condition, it is located in a turned-out depression 17 in the eccentric ring 12.

On the cutting body 9b shown in FIGS. 4 and 5, which is parallelogram-shaped in its top view, the roof ridges 17 run perpendicular to the opposing parallel sides 18 and 19, thereby bisecting the diagonals 20 and 21.

It is, of course, to be understood that the present invention is, by no means, limited to the particular construction shown in the drawing but also comprises any modifications within the scope of the appended claims.

What we claim is:

1. A chip-removing tool, which comprises: a shank having means thereon forming a first clamping surface, clamping means arranged above and in spaced relationship to said first clamping surface and including a second clamping surface facing said first clamping surface, a cutting body interposed between said first and second clamping surfaces, said cutting body having a roof-shaped portion and when seen from the top has the shape of a parallelogram, the ridge of said roof-shaped portion being perpendicular to two oppositely located sides of said parallelogram and bi-secting the diagonals of said parallelogram, and detachable means clamping said cutting body between said first and second clamping surfaces, said first and second clamping surfaces forming an acute angle with each other which has its apex located beyond and on that side of said shank on which the respective effective cutting edge of said cutting body in said clamped condition is located.

2. A chip-removing tool, which comprises: a shank having means thereon forming a first clamping surface, clamping means arranged above and in spaced relationship to said first clamping surface and including a second clamping surface facing said first clamping surface, a cutting body interposed between said first and second clamping surfaces, said first and second clamping surfaces forming an acute angle with each other which has its apex located beyond and on that side of said shank on which the respective effective cutting edge of said cutting body is located, that surface of said clamping means which is located opposite said second clamping surface being provided with elevated means, an eccentric ring mounted on said clamping means and having its bottom surface serrated for engagement with said elevated means, and clamping screw means having a head engaging said eccentric ring and having a threaded portion extending through said clamping means and screwed into said shank for firmly clamping said clamping means and said cutting body to said shank.

3. A tool according to claim 1, which includes spring means interposed between the head of said clamping screw means and said eccentric ring.

4. A chip-removing tool according to claim 1, in which said shank has a recess including said first clamping surface, and in which said cutting body is located in said recess so that two adjacent surfaces defining a portion of said parallelogram are laterally engaging adjacent walls of said recess, said roof-shaped portion of said cutting body forming a bottom surface thereof while the surface areas of said roof-shaped portions divided by said ridge form an obtuse angle with each other, one of said areas resting on said first clamping surface.

References Cited

UNITED STATES PATENTS

| 2,870,523 | 1/1959 | Richard | 29—96 |
| 3,158,921 | 12/1964 | Yost | 29—96 |
| 3,191,262 | 6/1965 | Gustafson | 29—96 |
| 3,205,557 | 9/1965 | Frommelt | 29—96 |
| 3,216,086 | 11/1965 | Keyszek | 29—96 |

FOREIGN PATENTS

| 896,902 | 11/1953 | Germany. |
| 1,126,701 | 3/1962 | Germany. |
| 1,136,185 | 9/1962 | Germany. |
| 453,173 | 9/1936 | Great Britain. |
| 568,875 | 4/1945 | Great Britain. |
| 591,969 | 4/1959 | Italy. |

WILLIAM W. DYER, JR., *Primary Examiner.*

HARRISON HINSON, *Examiner.*